(12) United States Patent
Rui et al.

(10) Patent No.: US 6,491,313 B1
(45) Date of Patent: Dec. 10, 2002

(54) VARIABLE DAMPER ASSEMBLY

(75) Inventors: Yuting Rui, Ann Arbor, MI (US); Timothy Gerard Offerle, Whittaker, MI (US); Thomas J. Walsh, Northville, MI (US); David Scott Rohweder, Troy, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/694,968

(22) Filed: Oct. 24, 2000

(51) Int. Cl.$^7$ .................................................. B60G 7/00
(52) U.S. Cl. ................ 280/90; 280/89.13; 188/322.15; 188/275; 188/279
(58) Field of Search ............................... 280/89.13, 90; 188/322.14, 322.15, 275, 279, 280

(56) References Cited

U.S. PATENT DOCUMENTS

| | | | |
|---|---|---|---|
| 3,769,996 A | * 11/1973 | Holbrook et al. | 137/627.5 |
| 3,982,674 A | * 9/1976 | Mildern | 222/402.1 |
| 4,185,721 A | * 1/1980 | Karklins et al. | 188/299 |
| 4,441,634 A | * 4/1984 | Meshberg | 222/402.1 |
| 4,655,440 A | * 4/1987 | Eckert | 188/299 |
| 4,730,816 A | * 3/1988 | Eckert | 188/299 |
| 4,846,317 A | * 7/1989 | Hudgens | 188/299 |
| 4,889,158 A | * 12/1989 | Rice et al. | 137/484.4 |
| 4,936,423 A | * 6/1990 | Karnopp | 188/299 |
| 5,139,119 A | * 8/1992 | Karnopp | 188/299 |
| 5,146,952 A | * 9/1992 | Tamamori | 137/627.5 |
| 5,150,690 A | * 9/1992 | Carter et al. | 137/627.5 |
| 5,156,645 A | * 10/1992 | Tsukamoto et al. | 280/714 |
| 5,385,329 A | * 1/1995 | Phillips | 137/101 |
| 5,544,715 A | * 8/1996 | Phillips | 180/422 |
| 6,152,254 A | * 11/2000 | Phillips | 180/422 |

FOREIGN PATENT DOCUMENTS

| | | | | |
|---|---|---|---|---|
| GB | 2186245 | * 8/1987 | | 280/90 |
| JP | 0012473 | * 1/1987 | | 280/90 |
| JP | 0224871 | * 10/1991 | | 280/90 |

* cited by examiner

*Primary Examiner*—Paul N. Dickson
*Assistant Examiner*—Toan To
(74) *Attorney, Agent, or Firm*—Gregory P. Brown

(57) ABSTRACT

A variable damper assembly 10 is provided for use with a vehicle power steering system and includes a variable orifice valve 20 which controls the flow of fluid between one chamber side 30 of the damper assembly to another chamber side 32 of the damper assembly. Variable orifice valve 20 is communicatively coupled to a source of pressurized fluid 110 by use of a conduit 112 and an electronically controlled valve assembly 114. The pressurized fluid received through conduit 112 controls the operation of valve 20. Based upon the pressure of the received fluid, valve 20 selectively increases and reduces the fluid flow rate between chamber sides 30 and 32, thereby causing the damper assembly 10 to have enhanced damping characteristics during certain vehicle operating conditions (e.g., during relatively high vehicle speed operating conditions).

9 Claims, 3 Drawing Sheets

VARIABLE DAMPER ASSEMBLY

FIELD OF THE INVENTION

This invention relates to a variable damper assembly and more particularly, to a variable damper assembly for use with a vehicle steering system and which includes an electronically controlled variable orifice valve which allows the damping characteristics of the damper assembly to be selectively and controllably altered based upon the speed and steering wheel angle of the vehicle.

BACKGROUND OF THE INVENTION

Damper assemblies are typically used within a vehicle steering assembly to reduce the forces that are transmitted to the steering wheel that may result from irregularities in the road surface. In this manner, damper assemblies improve impact feel and reduce steering "shimmy" and "nibble".

Damper assemblies provide a damping force which varies based upon the velocity of the damper according to a certain function, relationship or curve. Conventional damper assemblies typically have a single force versus velocity function or curve which does not vary based upon vehicle speed or other parameters. As a result, conventional damper assemblies have either a relatively high force/velocity curve which provides high damping of impacts while compromising steering effort, or have a relatively low force/velocity curve which maintains power steering effort at a desirable level, but does not substantially reduce steering shimmy and nibble.

There is therefore a need for a variable damper assembly which provides maximum impact resistance and shimmy and nibble reduction at relatively high vehicle speeds and neutral steering positions, while providing sufficient power steering capabilities at relatively low speeds and during parking maneuvers.

SUMMARY OF THE INVENTION

A first advantage of the invention is that it provides a variable damper assembly for use with a vehicle steering system which overcomes some or all of the previously delineated drawbacks of prior damper systems and assemblies.

A second advantage of the invention is that it provides a variable damper assembly for use with a vehicle steering system which includes an electronically controlled variable orifice valve which provides for force-velocity relationships which are selectively variable based upon vehicle speed and steering wheel angle data.

A third advantage of the present invention is that it provides a variable damper assembly for a vehicle steering system which allows the damping characteristics of the damper assembly to be selectively and controllably altered based upon the speed and steering wheel angle of the vehicle.

A fourth advantage of the present invention is that it provides a variable damper assembly for a vehicle steering system which provides relatively high damping at high vehicle speeds and relatively high power steering effort at low vehicle speeds and during parking maneuvers.

According to a first aspect of the present invention, a variable damper assembly is provided and includes a cylinder which forms a chamber containing an amount of fluid; a piston which is slidably disposed within the chamber and which is effective to divide the chamber into a first side and a second side; and a variable orifice valve which is fluidly coupled to the first the and the second side of the chamber and which allows a certain amount of pressurized fluid to flow between the first and the second side of the chamber, the variable orifice valve having a variable volume fluid flow path which is effective to selectively increase and decrease the fluid flow rate between the first and second sides of the chamber, thereby selectively altering the damping characteristics of the damper assembly.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
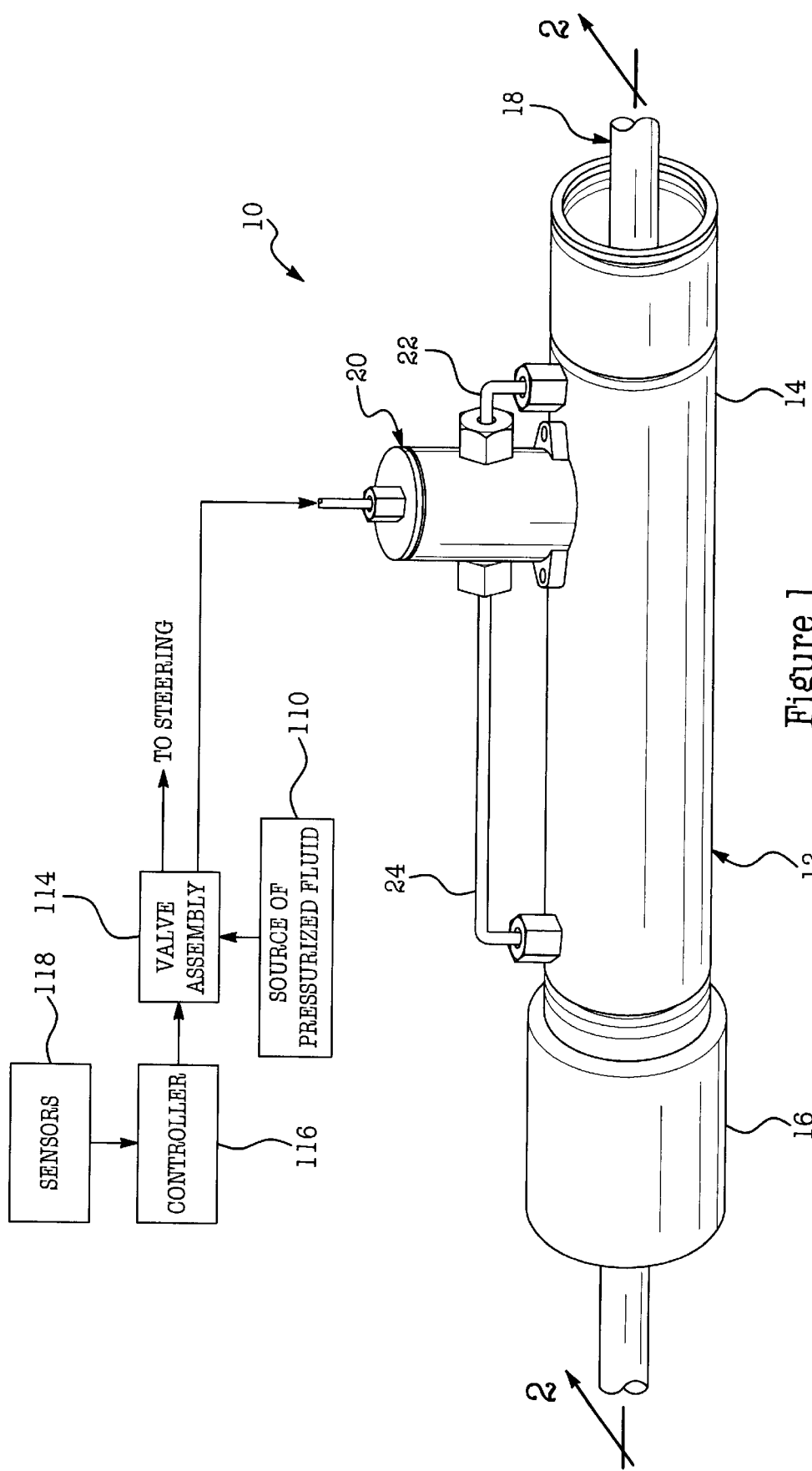
FIG. 1 is a perspective view of a variable damper assembly for a vehicle steering system which is made in accordance with the teachings of the preferred embodiment of the invention.
Figure 2:
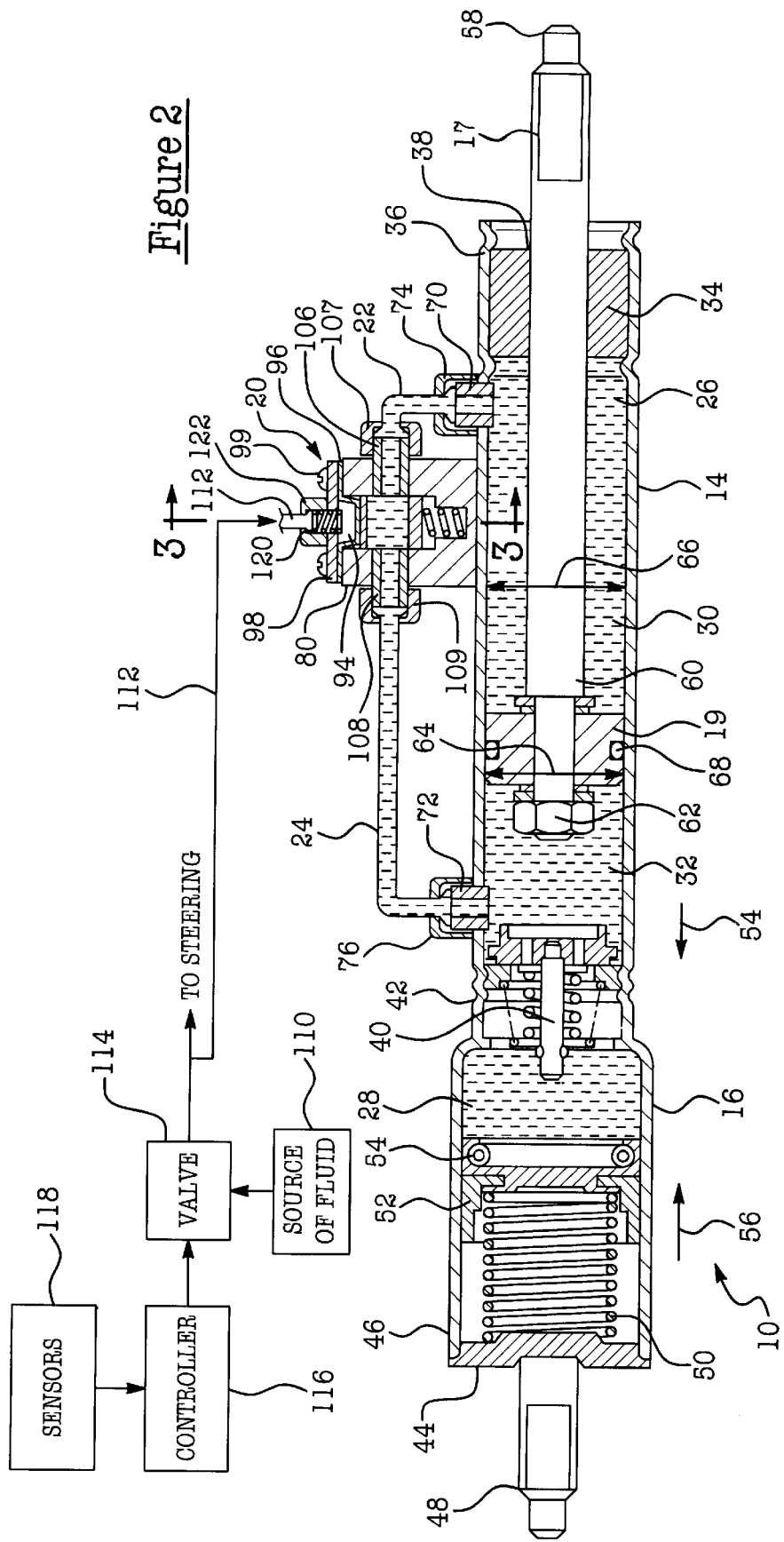
FIG. 2 is a sectional view of the variable damper assembly shown in FIG. 1, taken along view line 2—2.

Referring now to FIGS. 1–2, there is shown a variable damper assembly 10 which is made in accordance with the teachings of the preferred embodiment of the invention and which is adapted for use within a conventional vehicle steering system. Particularly, damper assembly 10 is adapted for selective attachment to a steering system (e.g., to the rack or center link of a steering system and to a cross member or strut) and provides selectively variable damping forces which absorb vibration and impacts which may be transferred to the steering system by the wheels of the vehicle. It should be appreciated that a steering system may use more than one assembly 10 (e.g., a substantially identical assembly may be used on each side of the vehicle).

As shown, assembly 10 includes a generally cylindrical housing 12 having a first piston-containing portion 14 which forms an interior fluid-containing chamber 26 and a second reservoir portion 16 which forms an interior fluid-containing chamber 28. A piston assembly 18 having a rod member 17 and a body portion 19 is slidably contained with chamber 26 and operatively divides chamber 26 into a "right" chamber portion or side 30 and a "left" chamber portion or side 32. Assembly 10 further includes a variable orifice valve 20 which is attached to housing portion 14, and which is fluidly coupled to the "right" and "left" chamber sides 30, 32 by way of conduits 22, 24, respectively. As discussed more fully and completely below, valve 20 controls the flow of fluid to and from the right and left chamber sides 30, 32.

Housing assembly 12 is made from a relatively strong durable material, such as a metal material. Housing portion 14 includes a plug member 34 which is disposed within end 36 of housing 12 and which includes a centrally disposed channel 38. The outer surface of member 34 sealingly engages the inner surface of housing 12 and the inner surface of member 34, which defines and/or forms channel 38, and sealingly engages piston rod 17, thereby preventing the escape of fluid from chamber 26 through end 36. Housing portion 14 further includes generally cylindrical conduits 70, 72 which fluidly communicate with chamber sides 30, 32, respectively. Conduits 70, 72 are integrally formed and/or sealingly disposed within housing portion 14, and are respectively and sealingly coupled to conduits 22, 24. Particularly, conduit 22 is coupled to conduit 70 by use of cap member 74 which is conformingly (e.g. frictionally), threadingly or otherwise sealingly secured to the conduit 70, and conduit 24 is coupled to conduit 72 by use of cap member 76, which is conformingly (e.g. frictionally), threadingly or otherwise sealingly secured to the conduit 72.

A conventional fluid flow valve assembly 40 is operatively disposed between chambers 26 and 28 at end 42 of housing portion 14 and is effective to control or limit the flow of fluid between chamber 26 and chamber 28.

Housing portion 16 includes a plug or cap 44 which is fixedly disposed within end 46 of housing 12. An attachment rod or member 48 is attached to cap 44 and is adapted for selective connection to a portion of the vehicle's steering system (e.g., to the rack or center link of the steering system). Reservoir chamber 28 of housing portion 16 includes a conventional spring 50 which operatively engages cap 44 and a piston 52 having a cup seal 54. Spring 50 exerts a force on piston 52 in the direction of arrow 56, effective to pressurize the fluid within chambers 28 and 26. Spring 50 is also effective to provide additional damping to assembly 10.

Piston rod 17 includes an attachment end 58 which is adapted for selective connection to a portion of the vehicle's steering/suspension system (e.g., to a cross member or strut). Piston body 19 is fixedly attached to an opposing end 60 of piston rod 17 by use of a conventional fastener 62. Piston body 19 is generally cylindrical in shape and has a diameter 64 which is substantially identical to the diameter 66 of interior chamber 26. Piston body 19 further includes an o-ring 68 which sealingly engages the interior surface of housing portion 14 which defines chamber 26, thereby substantially preventing fluid from flowing "through" or around piston 19. In this manner, when piston body 19 moves within chamber 26 in the directions of arrows 54 and 56, all fluid which is transferred between chamber sides 30 and 32 must flow through conduits 22, 24 and valve 20.

Figure 3:
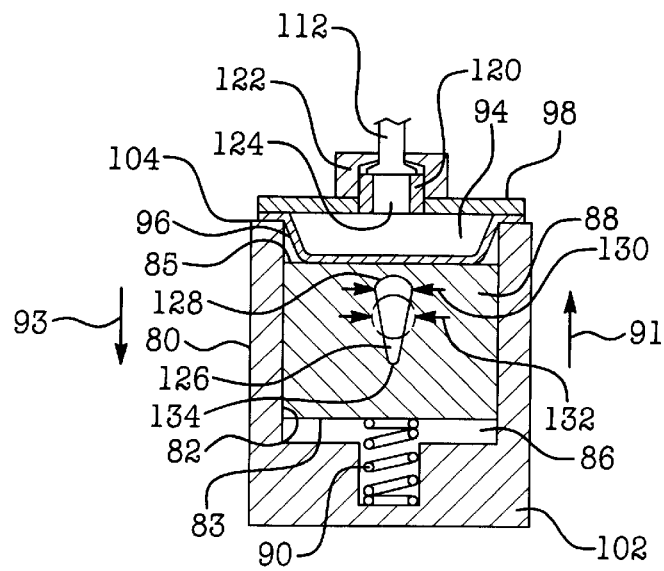
FIG. 3 is a sectional view of the variable orifice valve used within the variable damper assembly shown in FIGS. 1 and 2, taken along view line 3—3.
Figure 4:
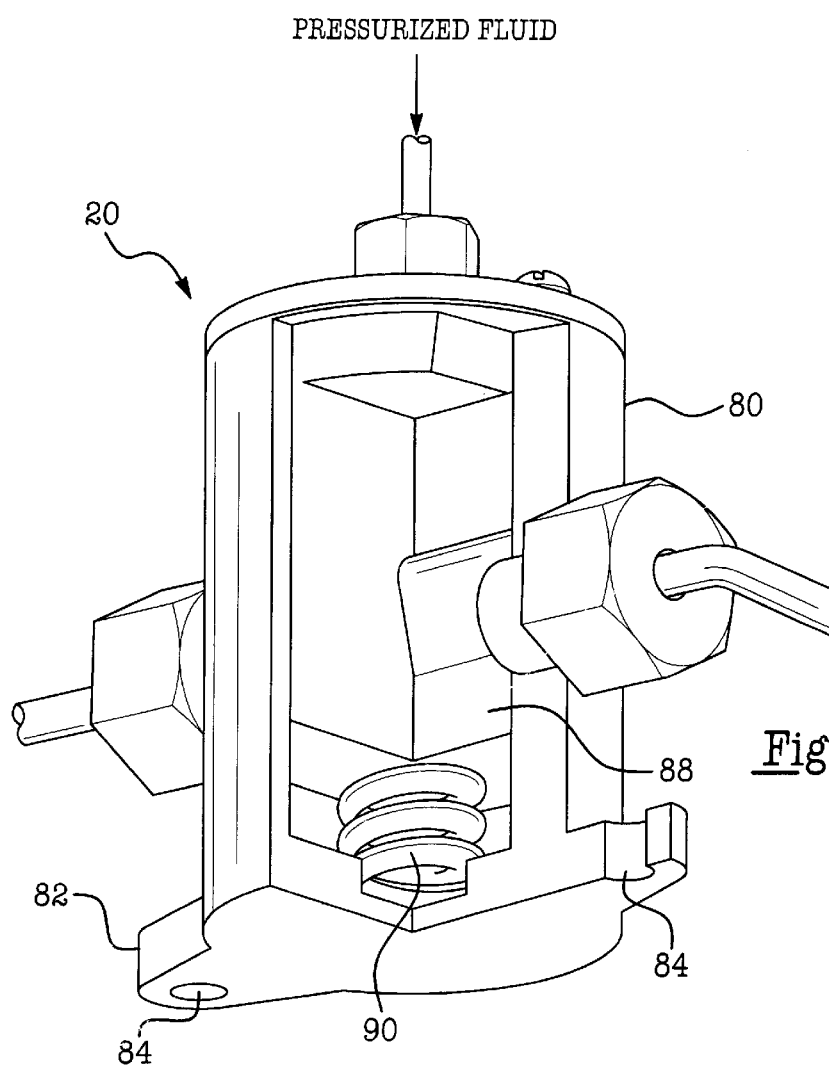
FIG. 4 is a perspective, partial cutaway view of a variable orifice valve which is used within the variable orifice valve shown in FIG. 1, illustrating a portion of the interior of the valve.

As shown best in FIGS. 2–4, variable orifice valve 20 includes a generally cylindrical housing 80 including a bottom flange portion 82 which includes a pair of apertures 84 which are adapted to receive conventional fasteners (not shown) for selective attachment to housing portion 14. Variable orifice valve is communicatively coupled to a source of pressurized fluid 110 (e.g., a conventional fluid reservoir and pump assembly) by use of a conduit 112 and an electronically controlled valve assembly 114 (e.g., a solenoid valve). As explained more fully and completely below, the pressurized fluid received through conduit 112 controls the operation of valve 20. Valve assembly 114 is communicatively coupled to a conventional electronic controller 116 which controls the operation of valve 114 based upon data (e.g., steering wheel angle and vehicle speed data) received from sensors 118. Sensors 118 are conventional vehicle attribute sensors which are effective to measure or sense certain vehicle attributes (i.e., steering wheel angle and vehicle speed) and to communicate signals to controller 116 representing those measured attributes.

Housing 80 includes a generally cylindrical inner chamber or cavity 86 which operatively contains a movable valve member or piston 88, a conventional spring 90 which is disposed in a first end 102 of chamber 86 and/or housing 80, and a selectively expandable sealed chamber 94 which is disposed in a second end 104 of chamber 86 and/or housing 80. Housing 80 further includes generally cylindrical conduits 106, 108 which are integrally formed and/or sealingly disposed within housing 80, and which are respectively and sealingly coupled to conduits 22 and 24. Particularly, conduit 22 is attached to conduit 106 by use of cap member 107 which is conformingly (e.g. frictionally), threadingly or otherwise sealingly secured to the conduit 106, and conduit 24 is attached to conduit 108 by use of cap member 109 which is conformingly (e.g. frictionally), threadingly and sealingly secured to the conduit 108.

Spring 90 is a conventional spring which engages the "bottom" surface 83 of member 88 and exerts a biasing force to member 88 in the direction of arrow 91.

Sealed chamber 94 contains a selectively expandable diaphragm 96 which is sealingly engaged between cover 98 and housing 80. In the preferred embodiment, cover 98 is attached to housing 80 by use of conventional fasteners 99. Expandable diaphragm 96 further abuttingly engages the "top" surface 85 of movable member 88. Conduit 112 is sealingly coupled to a conduit 120 formed within cover 98 by use of a cap member 122. Conduit 120 includes a centrally disposed channel 124 which fluidly communicates with sealed chamber 94 and allows pressurized fluid from conduit 112 to enter into chamber 94.

Movable member 88 is generally cylindrical and is shaped to conform to the interior surface of housing 80 which defines and/or forms chamber 86. In this manner, member 88 is slidably movable within cavity 86 in the directions of arrows 91, 93 (see FIG. 3). Member 88 includes a tapered channel 126 which extends through member 88 and which cooperates with conduits 106 and 108 to form a fluid flow path through valve 20. Channel 126 includes a top rounded portion 128 having a width or thickness 130 which is approximately the same as the diameter 132 of the fluid flow path formed by conduits 106, 108 and a bottom tapered or narrowed portion 134 which is substantially narrower than diameter 132.

In operation, controller 116 monitors sensors 118 to determine the amount of fluid pressure to be provided to the vehicle's power steering system. Particularly, controller 116 uses a conventional power steering algorithm to control the operation of valve 114 to determine the amount of pressure to be used to assist in steering. For example, at relatively high vehicle speeds and relatively low steering wheel angle positions, controller 116 and valve 114 cooperatively cause a lower fluid pressure to be communicated to the power steering system, thereby reducing the amount of hydraulic assist force and making the vehicle's steering "stiffer" or tighter. At relatively low speeds and relatively high steering wheel angle positions, controller 116 and valve 114 cooperatively cause a higher fluid pressure to be communicated to the power steering system, thereby increasing the amount of hydraulic assist force and making the vehicle easier to steer.

Importantly, this alteration in pressure to the steering system controls the operation of valve 20 in a manner which selectively alters the amount of damping provided by assembly 10. That is, when controller 116 and valve assembly 114 cooperate to lower the pressure of fluid within the steering system, the pressure of fluid communicated to valve 20 through conduit 112 is concomitantly reduced. This reduction in fluid pressure along with the force provided by spring 90 and the contracting force of diaphragm 96 force fluid out of chamber 94, thereby reducing the size of chamber 94 and causing member 88 to move "upward" in the direction of arrow 91. Member 88 moves to a position near the "top" end 104 of housing 80 in which the narrow end 134 of channel 126 is aligned with conduits 106 and 108. As a result, the volume of the fluid flow path through valve 20 is substantially reduced, and the rate of fluid flow which is allowed between chamber sides 30 and 32 is concomitantly reduced.

This reduced fluid flow rate increases the effort required to move piston assembly 18 within chamber 26 (e.g., in the directions of arrows 54, 56), thereby causing assembly 10 to exhibit higher damping characteristics. This relatively high damping provides improved resistance to impacts, raises dynamic toe resonance frequency, and increases resistance to steering shimmy/nibble. Hence, when fluid flow is reduced, the damper assembly absorbs impacts and vibrations which are transferred from the wheels of the vehicle through the cross members or struts prior to reaching the steering wheel. As a result, during relatively high vehicle speeds and neutral steering wheel angle positions, variable damper assembly 10 reduces the impacts felt from the front tires of the vehicle, and less motion and impact force is transmitted to the driver.

When controller 116 and valve assembly 114 cooperate to raise the pressure of fluid within the steering system, the pressure of fluid communicated to valve 20 through conduit 112 is concomitantly increased. The increase in fluid pressure causes diaphragm 96 to expand, thereby increasing the size of chamber 94 and causing member 88 to move "downward" in the direction of arrow 93 (see FIG. 3). Member 88 moves to a position near the "bottom" end 102 of housing 80 in which the widened end 128 of channel 126 is aligned with conduits 106, 108. As a result, the volume of the fluid flow path through valve 20 is substantially increased, and the fluid flow rate which is allowed between chamber sides 30, 32 through conduits 22, 24 is concomitantly increased. This increased fluid flow rate causes assembly 10 to exhibit lower damping characteristics. This relatively low damping allows the vehicle to be more easily steered.

It should be appreciated that in other alternate embodiments, variable orifice valve 20 may be actuated in a different manner and/or by a different controllable mechanism. For example and without limitation, the pressure responsive actuator (i.e., diaphragm 96) could be replaced with an electronically controlled actuator (e.g., a solenoid) or with any other suitable actuator.

It is understood that the invention is not limited by the exact construction or method illustrated and described above but that various changes and/or modifications may be made without departing from the spirit and/or the scope of Applicants' inventions.

What is claimed is:

1. A variable damper assembly comprising:
   a cylinder which forms a chamber containing a fixed amount of fluid;
   a piston which is slidably disposed within said chamber and which is effective to divide said chamber into a first side and a second side;
   a biasing spring in combination with a second piston which are disposed within said chamber and which are effective to pressurize said amount of fluid; and
   a variable orifice valve which is fluidly coupled to said first side and said second side of said chamber and which allows a certain amount of said pressurized fluid to flow between said first and said second sides of said chamber, said variable orifice valve having a variable volume fluid flow path which is effective to selectively increase and decrease the fluid flow rate between said first and second sides of said chamber, thereby selectively altering the damping characteristics of said damper assembly.

2. The variable damper assembly of claim 1 further comprising a reservoir chamber which is fluidly coupled to said chamber.

3. The variable damper assembly of claim 1 wherein said variable orifice valve further includes an expandable diaphragm which receives a second pressurized fluid from a source and to selectively alter the volume of said variable volume fluid flow path in response to receipt of said second pressurized fluid.

4. The variable damper assembly of claim 3 wherein said variable damper assembly is installed within a vehicle steering system and further comprising:
   an electronically controlled valve assembly which controls the pressure of said second pressurized fluid; and
   a controller which is communicatively coupled to said electronically controlled valve assembly and which selectively controls said electronically controlled valve assembly based upon a speed of said vehicle and a steering wheel angle of said vehicle.

5. The variable damper assembly of claim 4 wherein said electronically controlled valve assembly comprises a solenoid valve.

6. The variable damper assembly of claim 5 wherein said controller is effective to cause said electronically controlled valve assembly to increase the pressure of said second pressurized fluid when said speed of said vehicle is decreased, and to decrease the pressure of said second pressurized fluid when said speed of said vehicle is increased.

7. The variable damper assembly of claim 6 wherein said controller is further effective to cause said electronically controlled valve assembly to increase the pressure of said second pressurized fluid when said steering wheel angle is increased, and to decrease the pressure of said second pressurized fluid when said steering wheel angle is decreased.

8. A valve assembly comprising:
   a generally cylindrical housing having an interior cavity and a conduit which forms a fluid flow path;
   a piston slidably disposed within said interior cavity and having a tapered channel which cooperates with said conduit to form said fluid flow path, said piston being selectively movable from a first position in which said tapered channel causes said fluid flow path to have a first volume, to a second position in which said tapered channel causes said fluid flow path to have a second volume; and
   a selectively expandable sealed chamber which is disposed within said interior cavity and which selectively expands and contracts, effective to selectively cause said piston to move between said first position and said second positions, wherein said sealed chamber is formed by a diaphragm which abuttingly engages a first surface of said piston, said diaphragm being effective to selectively expand upon receipt of an amount of pressurized fluid, effective to cause said piston to move from said second position to said first position.

9. The valve assembly of claim 8 further comprising:
   a spring which is disposed at a second end of said interior cavity and which engages said piston, effective to impart a force on said piston which causes said piston to reside in said second position when said diaphragm is contracted.

* * * * *